(12) United States Patent
Mathewson

(10) Patent No.: US 7,697,850 B2
(45) Date of Patent: Apr. 13, 2010

(54) IMAGE-BASED PRINTER SYSTEM MONITORING

(75) Inventor: Edward Mathewson, Mclean, VA (US)

(73) Assignee: Infoprint Solutions Company, LLC, Boulder, CO (US)

( * ) Notice: Subject to any disclaimer, the term of this patent is extended or adjusted under 35 U.S.C. 154(b) by 1172 days.

(21) Appl. No.: 11/263,023

(22) Filed: Oct. 31, 2005

(65) Prior Publication Data

US 2007/0097419 A1    May 3, 2007

(51) Int. Cl.
*G03G 15/00* (2006.01)
*G06K 15/00* (2006.01)
*G06F 3/12* (2006.01)

(52) U.S. Cl. .................. 399/8; 358/1.1; 358/1.15; 358/1.16; 358/1.14; 399/9; 399/10; 399/12; 345/419; 345/1.2

(58) Field of Classification Search .............. 399/8–18, 399/21; 358/1.14–1.18, 504, 404–406; 345/418–420, 345/1.1–1.3, 2.1, 2.2, 3.1, 4–6, 156
See application file for complete search history.

(56) References Cited

U.S. PATENT DOCUMENTS 6,137,967 A * 10/2000 Laussermair et al. .......... 399/16
7,164,486 B1 * 1/2007 Nakamura et al. ......... 358/1.15
7,545,525 B2 * 6/2009 Idehara ....................... 358/1.15
2002/0049709 A1 * 4/2002 Miyasaki et al. ................ 707/1
2003/0085992 A1   5/2003 Arpa et al. ..................... 348/47
2003/0117673 A1   6/2003 Yamanaka .................. 358/498
2003/0133007 A1   7/2003 Iijima et al. ................... 348/46
2003/0169627 A1   9/2003 Liu ............................. 365/200
2006/0028432 A1 * 2/2006 Seki et al. .................... 345/156

FOREIGN PATENT DOCUMENTS

JP       62293111       12/1987
JP       05006065 A  *  1/1993

* cited by examiner

*Primary Examiner*—Twyler L Haskins
*Assistant Examiner*—Chad Dickerson
(74) *Attorney, Agent, or Firm*—Duft Bornsen & Fishman, LLP

(57) ABSTRACT

A printer monitoring interface is disclosed that uses a combination of dynamic three dimensional representations of a printing system and actual photographic images (still or video) of problem areas to give an operator monitoring the printing system realtime feedback, in both graphical and actual-image form, of areas of the printing system experiencing problems. The graphical images (which may also be actual photographic images) provide the operator with a representation of the overall system, and the actual images of problem areas provide the operator with the ability to actually see the problem that is occurring. The graphical and actual-image views are combined so that the operator can quickly and easily identify where in the system the problem is occurring, and quickly diagnose problems and determine solutions.

14 Claims, 4 Drawing Sheets

IMAGE-BASED PRINTER SYSTEM MONITORING

BACKGROUND OF THE INVENTION

1. Field of the Invention

This invention relates to the monitoring of printing systems and, more particularly, to a system for providing realtime status information for a printing system.

2. Description of the Related Art

The ability to instantly communicate the status of a printer to a user is limited by the text-based and two-dimensional graphical user interfaces used for communicating the printer status in the prior art. Problems are depicted in text format or diagram drawings; such depictions provide a generic representation of a problem and do not fully communicate the actual state of the printer. For example, if a paper jam occurs in the printing system, the printer operator must often reference a diagram displayed on a small screen that displays an iconic representation of the problem area without giving anything other than a general indication where in the printing system the particular area is located. This makes it very difficult to determine precisely where the printer jam has occurred or to diagnose the exact nature of the problem, and is particularly problematic in large, high-production printing systems that may occupy one or more entire room(s). Because these high-production printers are very expensive to run, quickly identifying and diagnosing printing problems and identifying the system state saves time and money by increasing printer up-time.

Accordingly, it would be desirable to have a printer monitoring system that provides a user with a more realistic depiction of the printing system being monitored and that can display actual views of problem areas correlated to the particular location in the overall printing system in which the problems are occurring.

SUMMARY OF THE INVENTION

The present invention comprises a machine monitoring interface (e.g., a printer monitoring interface) that uses a combination of dynamic three dimensional representations of a machine and actual photographic images (still or video) to give an operator monitoring the machine realtime feedback, in both graphical and actual-image form, of areas of the machine experiencing problems. The graphical images provide the operator with a representation of the overall system, and the actual images provide the operator with the ability to actually see the problem that is occurring. The graphical and actual-image views are combined so that the operator can quickly and easily identify where in the system the problem is occurring, and quickly diagnose problems and determine solutions.

In a preferred embodiment, a three-dimensional graphics engine and dedicated graphics acceleration hardware are used to deliver an accurate representation of the state of a printer. The ability to pan cameras around any printer and view it from any angle, both externally and internally, can be provided. Cameras mounted at selected maintenance points can provide a real view of problems that are occurring. In addition, complex maintenance procedures can be depicted graphically and concisely using the system of the present invention. An interface which uses three-dimensional representations of abstract functions and data for controlling hardware, software, and printing devices on the printing production floor. The console will feature the ability to "fly-through" a representation of the printing production floor and view selected maintenance points from a digital camera view. This interface allows for more realistic depiction and representation of printer state and work-flow interventions.

DETAILED DESCRIPTION OF THE PREFERRED EMBODIMENTS

Figure 1:
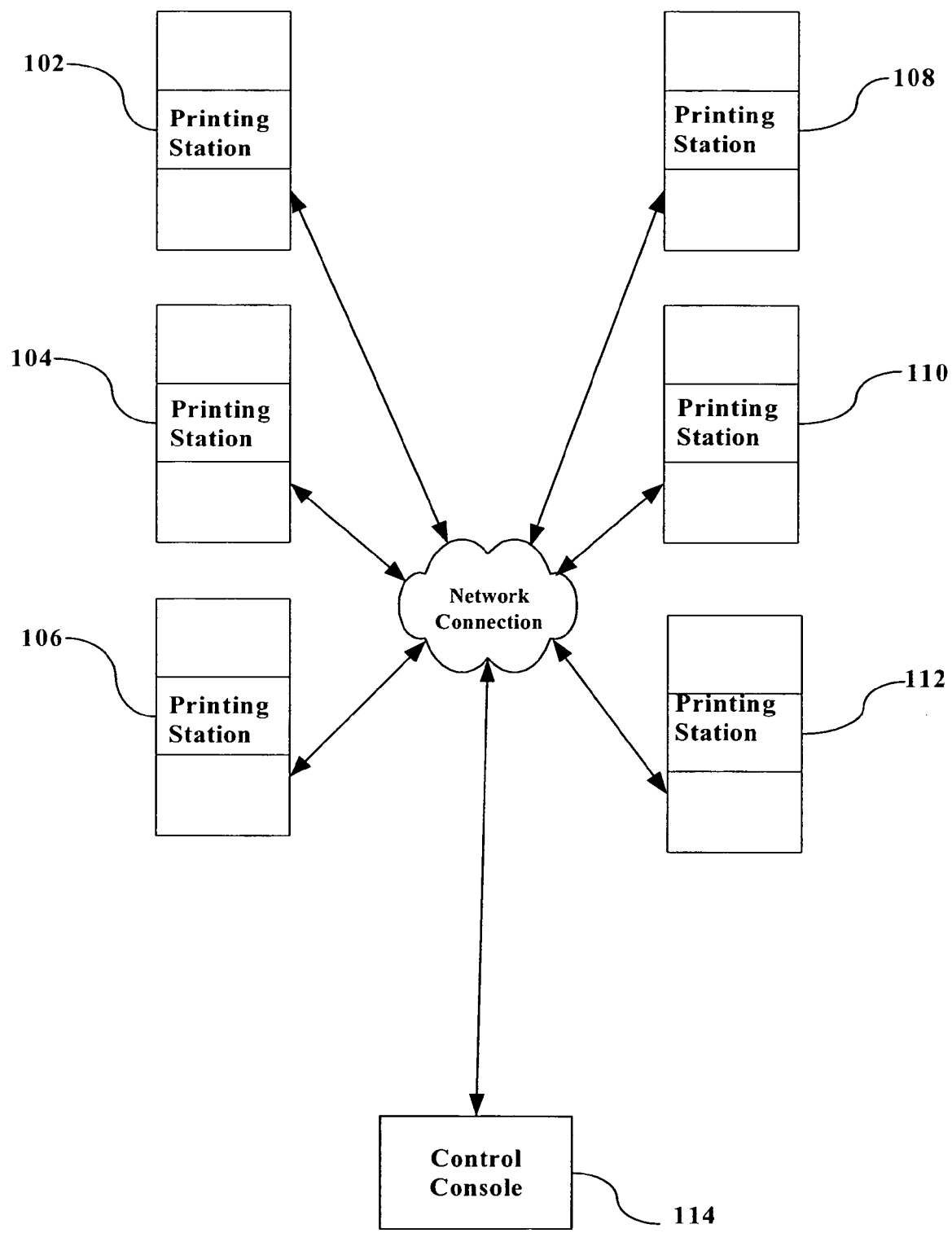
FIG. 1 is a block diagram illustrating a typical multi-station printing system.

FIG. 1 is a block diagram illustrating a typical multi-station printing system. Multiple printing stations 102, 104, 106, 108, 110, and 112 are coupled via a network connection to a control console 114. The network connection can be hardwired, over an internal network, or the internet, for example.

The printing stations illustrated in FIG. 1 can be any type of printing station, for example, a 3900 Duplex Advanced Function printing system manufactured by IBM. The IBM 3900 is a complex system and is thus perfectly suited for use with the present invention. Other examples of printing systems that would benefit from the use of the present invention include small and medium-scale printers that may require operator intervention when some mechanism in the printing process fails, as well as personal-use printers. Because users must often refer to the technical manual or documentation to locate a problem and identify a process to correct the problem, the present invention, which minimizes or negates the need to consult such a manual provides an efficient method of diagnosing and fixing printer errors. Further, the present invention need not be limited to printing systems but instead can be used with any machine/system where monitoring and diagnosing of the operation of machinery is desired, e.g., assembly lines, robotic assembly systems, and the like.

In prior art printing systems, printing jobs are fed to the various printing stations and the printing operations are performed thereon. The printing stations may be operated manually by a person who walks up to each printing station, or they can be controlled by control console 114. Even in situations where the printing is done manually, control console 114 may be used to monitor the operations of the printing stations and alert someone located by the control console of a problem with one or more of the printing stations.

As described above, in prior art systems, the only indication of a problem will be an identification of which printing station is having the problem, and a text or iconic representation of the problem area and the problem itself is displayed on a screen at control console 114. While this can be helpful, it provides only minimal information to assist the user in identifying the location of the problem and diagnosing it.

In accordance with the present invention, a display system is provided which can comprise conventional cameras (e.g., digital cameras or video cameras) that are positioned within the printing systems at locations where problems or other maintenance activities typically occur (e.g., around paper feeders, near paper paths, etc.). In addition, another display system is provided comprising still or video cameras situated at various locations on the production floor to provide overview images of the various printing stations. In a preferred embodiment, the cameras can be panned by a user so that they may be positioned to view specific locations when desired.

A processor is also provided configured (e.g., via software) to enable selected images (still or video) to be juxtaposed upon an overall image of the production floor on the display device, with a visual link made on the display device between the specific image and the overall image to identify which printing station the specific image is associated with.

Figure 2:
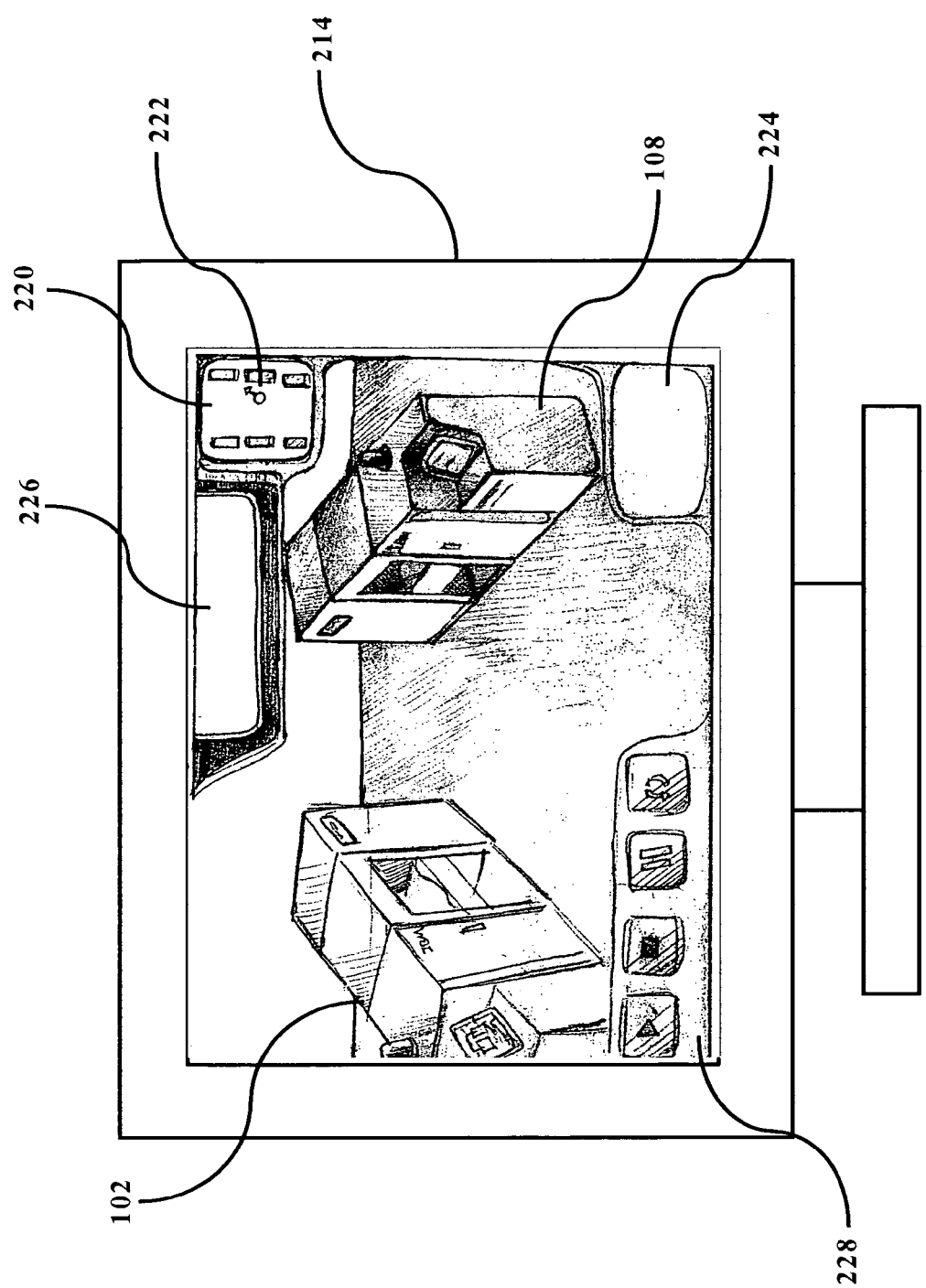
FIG. 2 illustrates an image displayed to an operator showing an image of a specific portion of the production floor depicted in the block diagram of FIG. 1.

Referring to FIG. 2, an image displayed to an operator, e.g., on a display device located at control console 114, shows an image of a specific portion of the production floor depicted in the block diagram of FIG. 1. More specifically, the image shows printing station 102 on the left and printing station 108 on the right. A graphical user interface (GUI) is provided. For example, a display area 220 shows a block diagram similar to that of FIG. 1, identifying the various printing stations on the production floor. A designator 222 illustrates the particular portion of the production floor being displayed on the display device 214. In this example, the pointer 222 is pointing towards the printing station 108 in the upper right of the production floor depiction, and as can be seen in the display of display device 214, printing station 108 is in direct view, while printing station 102 is also in view on the left side. In other words, the user can look at display 220 and the designator 222 and know approximately which portion of the production floor the camera is currently displaying on display device 214.

Although no text is shown, message areas 224 and 226 are provided to provide various messages which may also be provided, in text format, to the user. In addition, controls 228 are provided which, in connection with a mouse or through the use of a touch screen, allow various control functions to be accessed. For example, the panning of the camera can be controlled by controls 228 and video replays of what is being shown on screen 214 can also be controlled in a well known manner. The controls could also be used to play back videos or animations giving instructions regarding how to fix a particular problem.

Figure 3:
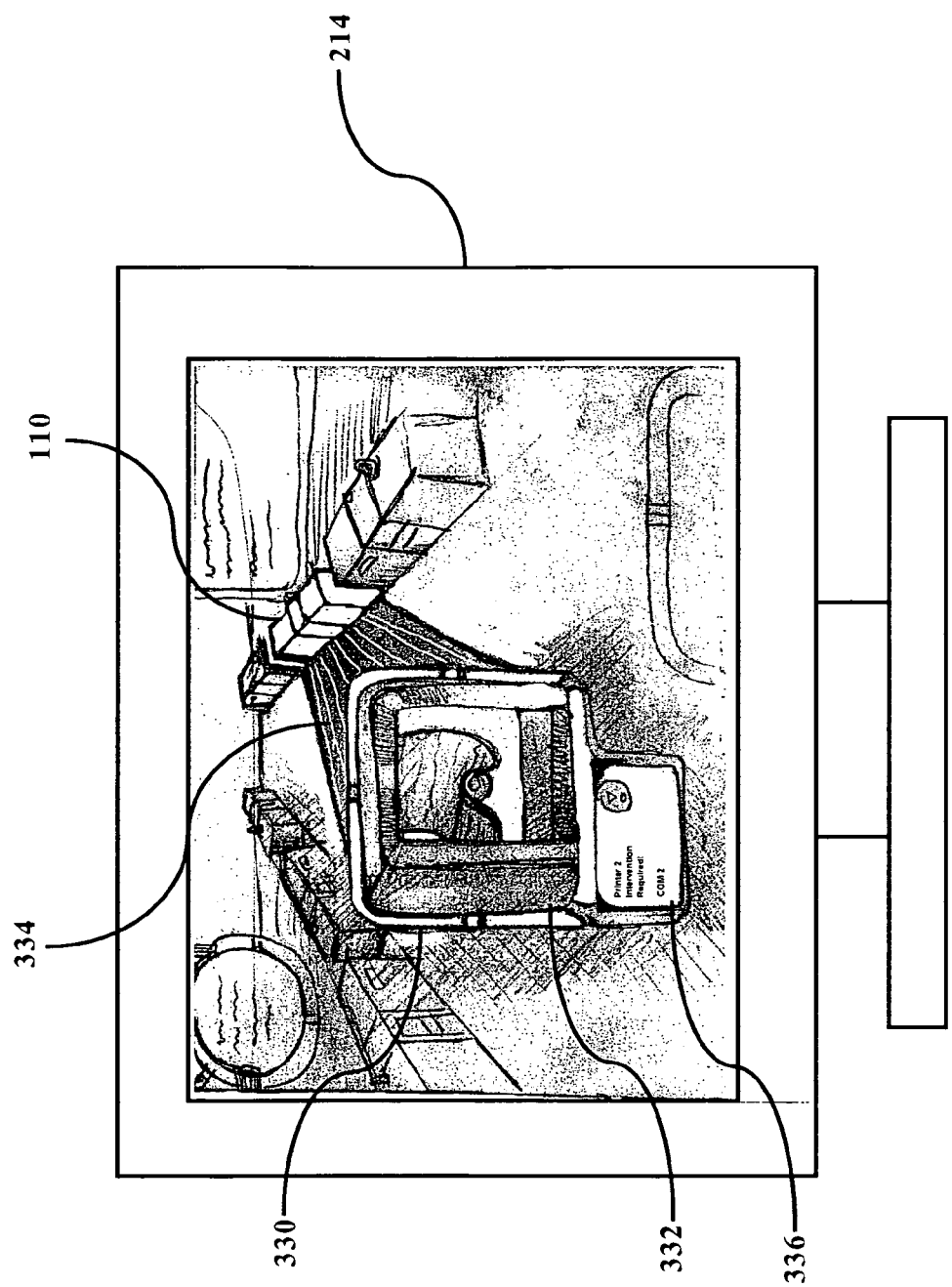
FIG. 3 illustrates a specific aspect of the present invention, whereby an actual image of a real problem area, along with a text message indicating a problem to be resolved.

FIG. 3 illustrates a specific aspect of the present invention, whereby an actual image of a real problem area, along with a text message indicating a problem to be resolved, are displayed. Referring to FIG. 3, monitor 214 displays an overall view of the production floor illustrated in FIG. 1 and juxtaposed thereon is a viewer 330. Viewer 330 displays an image 332 of a specific problem occurring in printing station 110. As can be seen, a "trail" 334 visually links the image viewer 330 with the image of printing console 110, thereby indicating to a viewer of display 214 that the problem shown in viewer 330 is occurring in printing station 110. A text display area 336 is also shown that provides text information regarding the particular problem being shown in image 332. In FIG. 3, a printer roller area is illustrated with a paper jam occurring. In accordance with the present invention, the image 332 is either a video image showing a live picture of the problem area, or a still photo taken at the time the problem occurred. This provides a user of the present invention with an exact photograph or video image of the problem, and also directs the user to where the problem is occurring.

Any information desired to assist the operator can be provided in text area 336. For example, the text information can identify the nature of the problem, and can also provide instructions as to how to fix the problem. The text can also include a specific printer console number so that the user, in addition to having the visual cues displayed in the images, can also have a text direction as to where the problem is occurring.

In addition, as described above, the user may be given the ability to play a video, animation, or even a sound file that will given the user instructions on how to fix the problem.

Camera technology and display technology is well known and need not be described further herein. Any known camera and/or display technology may be used to enable the present invention. Likewise, the means of displaying the photographic or video images and the creation of appropriate GUIs to display the images and provide control mechanisms therefor are also well known. Further, control of the cameras and the switching between views, etc. can be performed using known mechanical and/or software methods.

Figure 4:
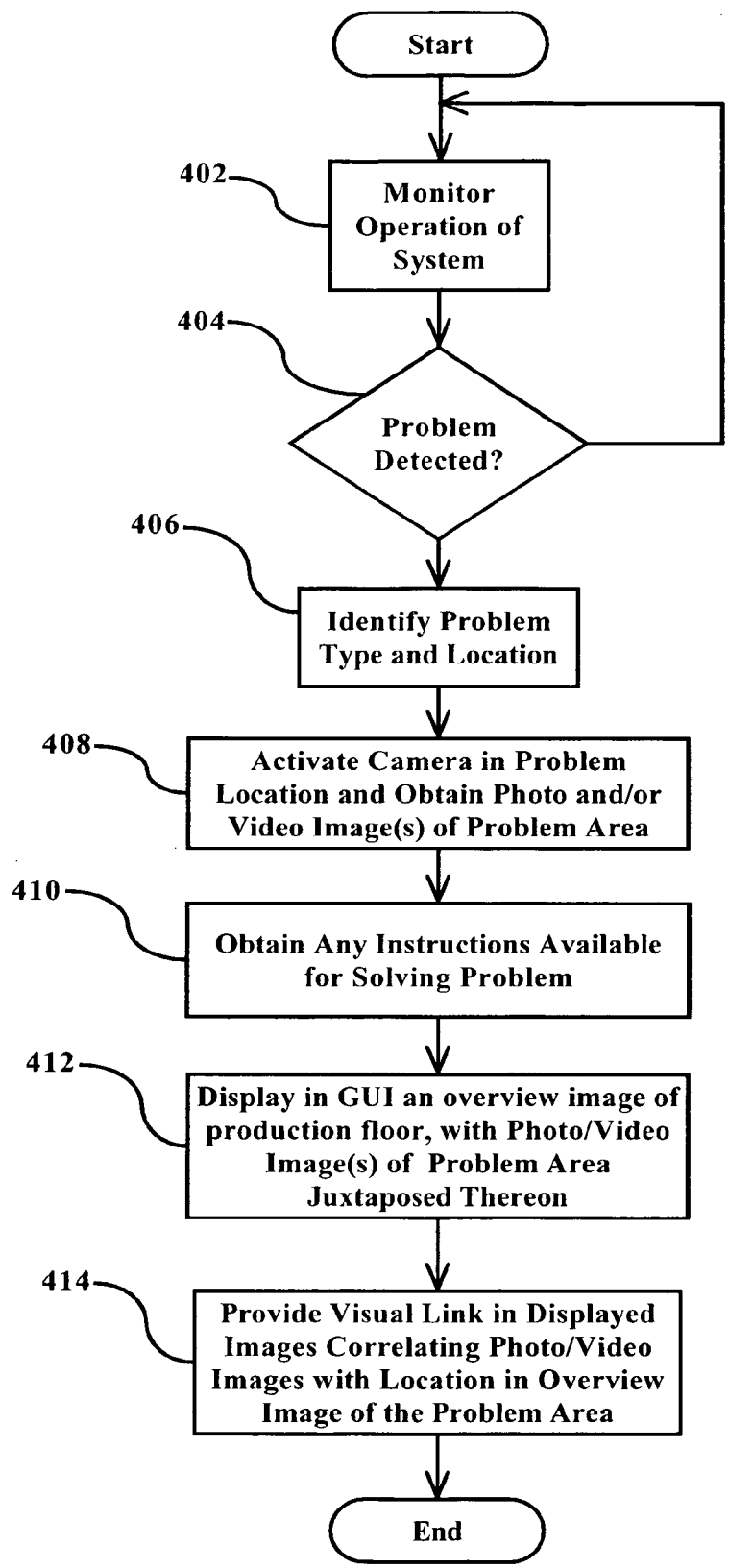
FIG. 4 is a flowchart illustrating a basic set of steps that can be performed in accordance with a method of the present invention.

FIG. 4 is a flowchart illustrating a basic set of steps that can be performed in accordance with the method of the present invention. At step 402, the operation of the system, e.g., a printing system, is monitored in a known manner. At step 404, a determination is made as to whether or not a problem has been detected. If no problem has been detected, the process proceeds back to step 402 and the monitoring operation is continued.

If, at step 404, a problem has been detected, then at step 406, the problem type and location is identified. At step 408, a camera located in the problem area is activated and photos and/or video images of the problem area are obtained. At step 410, any available instructions for solving the problem are retrieved, e.g., from a database or other storage location.

At step 412, a GUI is displayed on a display device (e.g., at control console 114 of FIG. 1) and an overview image of the production floor is displayed, along with the photo/video images of the problem area juxtaposed thereon. As shown in FIGS. 2 and 3, the overview can be a broad-angle view of the entire production floor, and the photo/video images can be displayed in a display area of the GUI. At step 414, a visual link is provided in the images displayed on the display device, which visual link correlates the photo/video images with their location in the overview image, to thereby correlate the photo/video images with the particular location in the overview image. This provides a link to the viewer between the problem area and the problem that is occurring in that problem area. At the same time, if desired, instructions and/or instructional video/animation can be provided to the user in the GUI display to provide instructions on correcting any problems that are occurring. At step 416 the process ends.

The above-described steps can be implemented using standard well-known programming techniques. The novelty of the above-described embodiment lies not in the specific programming techniques but in the use of the steps described to achieve the described results. Software programming code which embodies the present invention is typically stored in permanent storage. In a client/server environment, such software programming code may be stored with storage associated with a server. The software programming code may be embodied on any of a variety of known media for use with a data processing system, such as a diskette, or hard drive, or CD ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

It will be understood that each element of the illustrations, and combinations of elements in the illustrations, can be implemented by general and/or special purpose hardwarebased systems that perform the specified functions or steps, or by combinations of general and/or special-purpose hardware and computer instructions.

These program instructions may be provided to a processor to produce a machine, such that the instructions that execute on the processor create means for implementing the functions specified in the illustrations. The computer program instructions may be executed by a processor to cause a series of operational steps to be performed by the processor to produce a computer-implemented process such that the instructions that execute on the processor provide steps for implementing the functions specified in the illustrations. Accordingly, the figures support combinations of means for performing the specified functions, combinations of steps for performing the specified functions, and program instruction means for performing the specified functions.

Although the present invention has been described with respect to a specific preferred embodiment thereof, various changes and modifications may be suggested to one skilled in the art and it is intended that the present invention encompass such changes and modifications as fall within the scope of the appended claims.

I claim:

1. A system for monitoring printing stations on a printing production floor, the system comprising:
    a sensing element sensing a problem area of a printing station on the printing production floor, wherein the printing production floor includes a plurality of printing stations;
    a display system displaying a three-dimensional representation of an overview image of the printing production floor, an indication of the problem area of the printing station on the printing production floor, and photographic images of one or more portions of the printing station on the printing production floor inside of the three-dimensional representation of the overview image of the printing production floor; and
    a processor configured to visually correlating the photographic images to a portion of the three-dimensional image corresponding to the problem area,
    whereby when a problem area of the printing station on the printing production floor is identified, the three-dimensional image and at least one of the photographic images are simultaneously displayed on the display system such that the correlation of the at least one of the photographic images to the portion of the three-dimensional image corresponding to the problem area is apparent.

2. The system of claim 1, wherein the display system comprises a processor coupled to a display monitor, the processor storing the three-dimensional representation and displaying the three-dimensional representation on the display monitor.

3. The system of claim 2, wherein the display system further comprises a digital camera coupled to the processor and positioned to take overview photographs of the printing station on the printing production floor, the processor being configured to control the operation of the digital camera and to store the overview photographs as the three-dimensional representation of the printing station on the printing production floor.

4. The system of claim 2, wherein the three-dimensional representation comprises a computer generated image of the printing station on the printing production floor.

5. The system of claim 3, wherein the display system comprises:
    one or more photographic imaging devices, coupled to the processor, situated at locations within the printing station on the printing production floor where problems are known to occur, the processor configured to control the operation of said one or more photographic imaging devices and to store photographic images of said locations and displaying the photographic images of said locations on said display monitor.

6. The system of claim 5, wherein said photographic imaging devices comprise digital still cameras.

7. The system of claim 5, wherein the photographic imaging devices comprise video cameras.

8. The system of claim 1, further comprising:
    predefined correction instructions providing instructions for correcting problems occurring at the problem areas, the predefined correction instructions being stored on the interface and displayed on the display monitor when a problem with the printing station on the printing production floor is sensed by the sensing element.

9. A method of monitoring the operation of a printing station on a printing production floor, the method comprising:
    placing a digital camera in a position enabling it to take overview photographs of the printing station on the printing production floor;
    sensing problems occurring in one or more areas of the printing station on the printing production floor, wherein the printing production floor includes a plurality of printing stations;
    obtaining photographic images from the digital camera of the one or more areas of the printing station on the printing production floor in which problems have been sensed;
    displaying a three-dimensional representation on a display monitor of the overview image of the printing production floor, an indication of the printing station on the printing production floor and the obtained photographic images of one or more areas of the printing station on the printing production floor in which problems have been sensed, wherein the obtained photographic images are displayed inside the three-dimensional representation of the overview image of the printing production floor;
    configuring a processor to control the operation of the digital camera and to store the overview photographs as the three-dimensional representation of the printing station on the printing production floor and to display the three-dimensional representation on the display monitor; and
    visually correlating the photographic images on the display monitor to a portion of the three-dimensional image corresponding to the one or more areas of the printing station on the printing production floor in which problems have been sensed,
    whereby the three-dimensional image and at least one of the photographic images are simultaneously displayed on the display monitor such that the correlation of the at least one of the photographic images to a portion of the three-dimensional image corresponding to the one or more areas of the printing station on the printing production floor in which problems have been sensed is apparent.

10. The method of claim 9, wherein the three-dimensional representation comprises a computer generated image of the printing station on the printing production floor.

11. The method of claim 9, further comprising:
    placing one or more photographic imaging devices at locations within the printing station on the printing production floor where problems are known to occur; and
    configuring the processor to control the operation of the one or more photographic imaging devices and to store photographic images of the locations and display the photographic images of the locations on the display monitor.

12. The method of claim 11, wherein the photographic imaging devices comprise digital still cameras.

13. The method of claim 11, wherein the photographic imaging devices comprise video cameras.

14. The method of claim 9, further comprising:
displaying predefined correction instructions for correcting problems occurring at the problem areas on the display monitor when a problem with the printing station on the printing production floor is sensed.

* * * * *